United States Patent
Yamawaki et al.

(10) Patent No.: US 11,092,945 B2
(45) Date of Patent: Aug. 17, 2021

(54) CONTROL DEVICE, CONTROL METHOD, AND NON-TRANSITORY STORAGE MEDIUM STORING CONTROL PROGRAM

(71) Applicant: OMRON Corporation, Kyoto (JP)

(72) Inventors: Yasushi Yamawaki, Los Angeles, CA (US); Shigenori Sawada, Takatsuki (JP); Kojiro Baba, Kusatsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/640,057

(22) PCT Filed: Jan. 22, 2019

(86) PCT No.: PCT/JP2019/001744
§ 371 (c)(1),
(2) Date: Feb. 19, 2020

(87) PCT Pub. No.: WO2019/176286
PCT Pub. Date: Sep. 19, 2019

(65) Prior Publication Data
US 2020/0225645 A1    Jul. 16, 2020

(30) Foreign Application Priority Data
Mar. 13, 2018  (JP) .............................. JP2018-045124

(51) Int. Cl.
*H04L 12/40* (2006.01)
*H04L 12/26* (2006.01)
*G05B 19/418* (2006.01)

(52) U.S. Cl.
CPC .... *G05B 19/4186* (2013.01); *H04L 12/40019* (2013.01); *H04L 43/0852* (2013.01);
(Continued)

(58) Field of Classification Search
CPC .......... H04L 12/40019; H04L 43/0852; H04L 2012/4026; G05B 19/4186
See application file for complete search history.

(56) References Cited

U.S. PATENT DOCUMENTS 7,460,560 B2 * 12/2008 Bruckner .............. H04J 3/0652
                                                           370/352
8,171,113 B2 *  5/2012 Shuster .................. H04L 29/06
                                                           709/219
(Continued)

FOREIGN PATENT DOCUMENTS

JP    H10133966    5/1998
JP    2012060207   3/2012
(Continued)

OTHER PUBLICATIONS

"International Search Report (Form PCT/ISA/210) of PCT/JP2019/001744," dated Apr. 23, 2019, with English translation thereof, pp. 1-3.
(Continued)

Primary Examiner — Rasheed Gidado
(74) Attorney, Agent, or Firm — JCIPRNET

(57) ABSTRACT

Provided is a control device comprising a communication management part, a computation part, and a result output part. The communication management part is for managing data communication using cyclic communication conforming to a prescribed communication cycle with respect to a field network. The computation part is for measuring a propagation delay time from received data corresponding to actual measurement data for a propagation delay having been transmitted to the field network, and detecting an operation state of the field network using the propagation delay time measurement result. The result output part is for outputting the result of the detection performed by the computation part.

9 Claims, 5 Drawing Sheets

(52) U.S. Cl.
CPC ............ *G05B 2219/31135* (2013.01); *G05B 2219/33342* (2013.01); *G05B 2219/34279* (2013.01); *H04L 2012/4026* (2013.01)

(56) References Cited

U.S. PATENT DOCUMENTS

| | | | |
|---|---|---|---|
| 8,812,759 B2* | 8/2014 | Luttenbacher | H04L 1/22 710/106 |
| 9,065,668 B1* | 6/2015 | Katar | H04L 41/0896 |
| 2002/0002406 A1* | 1/2002 | Bermann | G05B 19/18 700/2 |
| 2007/0250741 A1* | 10/2007 | Ehlers | H04L 25/0262 714/43 |
| 2009/0059947 A1* | 3/2009 | Barthel | H04L 12/437 370/437 |
| 2018/0284710 A1* | 10/2018 | Abe | G05B 19/054 |

FOREIGN PATENT DOCUMENTS

| | | |
|---|---|---|
| JP | 2014146070 | 8/2014 |
| JP | 2017117267 | 6/2017 |

OTHER PUBLICATIONS

"Written Opinion of the International Searching Authority (Form PCT/ISA/237) of PCT/JP2019/001744," dated Apr. 23, 2019, with English translation thereof, pp. 1-8.

* cited by examiner (A)

(B)

(A)

(B)

CONTROL DEVICE, CONTROL METHOD, AND NON-TRANSITORY STORAGE MEDIUM STORING CONTROL PROGRAM

CROSS-REFERENCE TO RELATED APPLICATION

This application is a 371 application of the international PCT application serial no. PCT/JP2019/001744, filed on Jan. 22, 2019, which claims the priority benefit of Japan application no. 2018-045124, filed on Mar. 13, 2018. The entirety of the above-mentioned patent application is hereby incorporated by reference herein and made a part of this specification.

BACKGROUND

Technical Field

The present invention relates to a technology for communicating control data in a predetermined cycle using a field bus system such as EtherCAT (registered trademark).

Background Art

Currently, many factory automation (FA) systems are in practical use. The FA systems include, for example, a control device and a plurality of slave devices, as described in Patent Literature 1. The plurality of slave devices is a measurement instrument, a switch, a control driver, or the like, and a control target device is connected to the control driver.

For example, the control device and the plurality of slave devices communicate control data using a fieldbus system. In this case, the control device and the plurality of slave devices communicate control data in a preset control cycle (cyclic cycle). Thereby, punctuality, a real-time property, and high speed of communication of the control data are ensured.

Normally, the control cycle is set by a setting tool such as a PC connected to the control device. In this case, the control cycle is set according to the number and topology of a plurality of slave devices connected to a field bus.

CITATION LIST

Patent Literature

[Patent Literature 1]
Japanese Patent Laid-Open No. 2014-146070

SUMMARY

Technical Problem

However, the control system may not start up normally depending on content set by the setting tool.

Accordingly, an objective of the present invention is to provide a technology capable of more reliably realizing normal startup of a control system.

Solution to Problem

According to an example of the present disclosure, the control device includes a communication management part, a computation part, and a result output part. The communication management part is configured to manage data communication using cyclic communication conforming to a predetermined communication cycle for a field network. The computation part is configured to measure a propagation delay time from received data of data for actual measurement of propagation delay transmitted to the field network, and detect an operation state of the field network using a measurement result of the propagation delay time. The result output part is configured to output a detection result of the computation part.

In this configuration, an operation state of communication via the field network is detected and provided to a user before a main operation of the control device starts.

According to an example of the present disclosure, the computation part includes a propagation delay time measurement part configured to perform measurement of the propagation delay time from the received data of the data for actual measurement of propagation delay; and a monitoring process execution part configured to perform monitoring of a bandwidth load of the field network from the propagation delay time.

In this configuration, the bandwidth load can be obtained together with the propagation delay time as the operation state.

According to an example of the present disclosure, the computation part includes a diagnosis process execution part configured to perform a diagnosis of cables for use in the field network on the basis of a reception state of the data for actual measurement of propagation delay.

In this configuration, a cable state diagnosis result can be obtained as the operating state.

According to an example of the present disclosure, the computation part executes a process of detecting the operation state of the field network when an operation input of a running-in operation is received.

In this configuration, detection of the operation state of the field network is executed in response to an operation input from the user.

Advantageous Effects of Invention

According to the present invention, normal startup of the control system can be more reliably realized.

DESCRIPTION OF THE EMBODIMENTS

Hereinafter, embodiments of the present invention will be described with reference to the drawings.

Application Example

Figure 3:
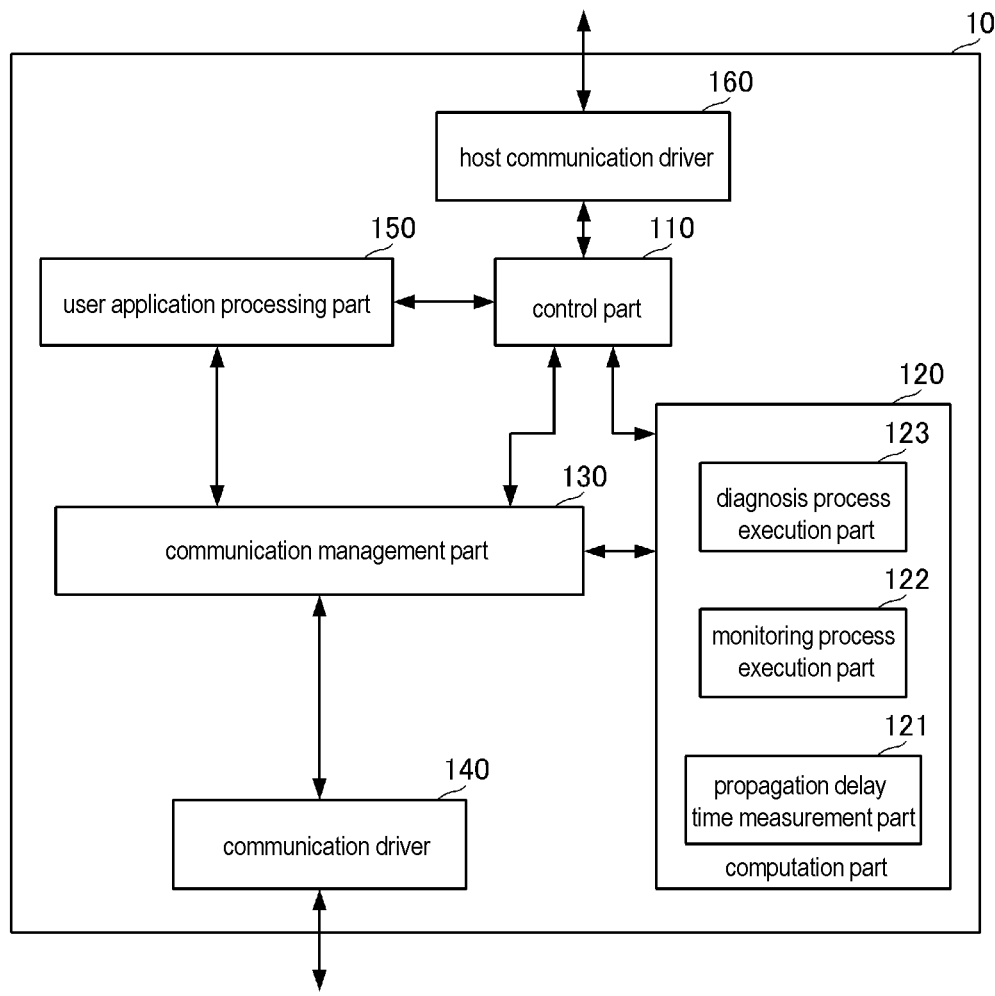
FIG. 3 is a functional block diagram of the control device.

First, an application example of a control device according to an embodiment of the present invention will be described with reference to the drawings. FIG. 3 is a functional block diagram of the control device.

The control device 10 includes a control part 110, a computation part 120, a communication management part 130, a communication driver 140, a user application processing part 150, and a host communication driver 160, as illustrated in FIG. 3.

The computation part 120 includes a propagation delay time measurement part 121, a monitoring process execution part 122, and a diagnosis process execution part 123.

The control part 110 receives an operation input for a running-in operation from a user via the host communication driver 160. The control part 110 outputs information on the operation input of the running-in operation to the computation part 120 and the communication management part 130.

The propagation delay time measurement part 121 of the computation part 120 receives the operation input of the running-in operation, generates data for actual measurement of a propagation delay time, and outputs the data for actual measurement of the propagation delay time to the communication management part 130.

Figure 1:
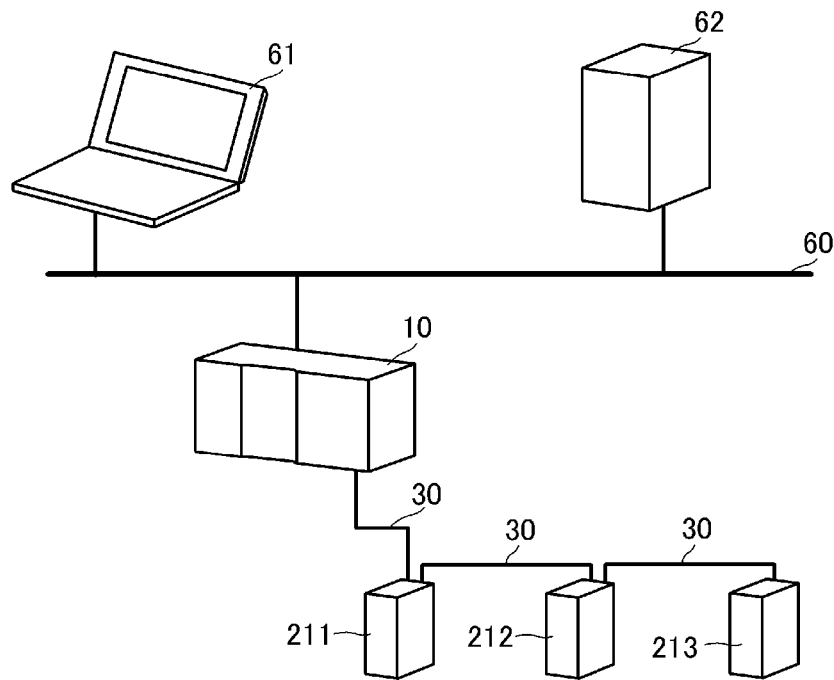
FIG. 1 is a diagram illustrating a schematic configuration of a device in a control system.
Figure 2:
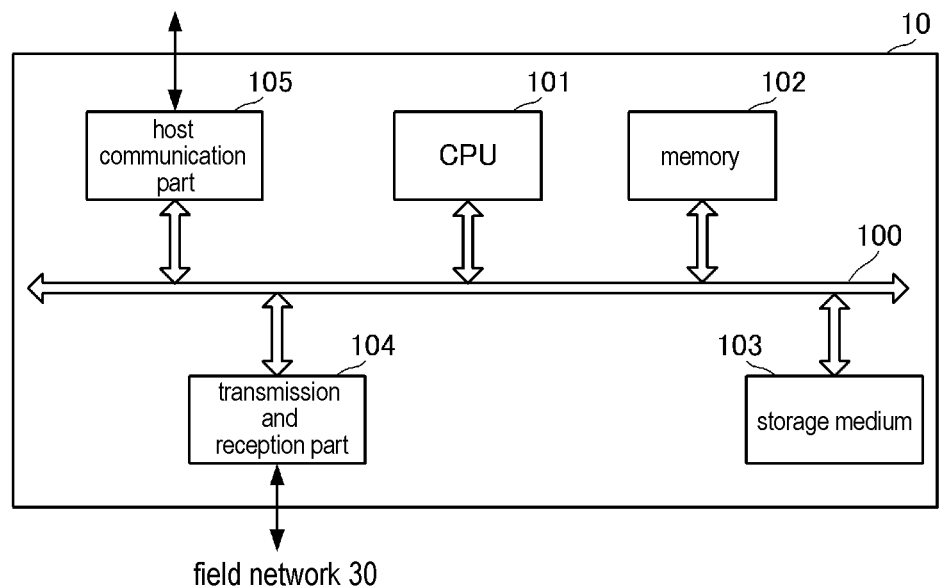
FIG. 2 is a block diagram illustrating a hardware configuration of a control device.

The communication management part 130 transmits the data for actual measurement of the propagation delay time to the field network 30 via the communication driver 140 (see FIGS. 1 and 2). The communication management part 130 acquires received data of the data for actual measurement returned from the field network 30, and outputs the received data to the computation part 120.

The propagation delay time measurement part 121 measures the propagation delay time from the received data. The monitoring process execution part 122 calculates a bandwidth load using a communication cycle set by the user application processing part 150 and the propagation delay time. When the received data cannot be obtained, the diagnosis process execution part 123 starts up a diagnostic mode for cables constituting the field network 30 and executes cable diagnosis.

The computation part 120 generates result display data including results thereof and outputs the result display data to the control part 110. The control part 110 outputs the result display data to a personal computer 61 via the host communication driver 160, and the personal computer 61 displays the result display data (see FIGS. 5(A) and 5(B)). The personal computer 61 (see FIG. 1) can also be caused to execute a process of the computation part 120. In this case, the control device 10 outputs the received data of the data for actual measurement of propagation delay to the personal computer 61 via the host communication driver 160.

Thereby, the user can confirm an operation state of the field network 30 before a main operation of the control device 10 starts.

Configuration Example

A control device, a control method, and a control program according to an embodiment of the present invention will be described with reference to the drawings. In the embodiment, a factory automation (FA) system will be described as an example of the control system.

FIG. 1 is a diagram illustrating a schematic configuration of a device in the control system. The control system 1 includes a control device 10, a slave device 211, a slave device 212, a slave device 213, a field network 30, an information communication network 60, the personal computer 61, and a database device 62, as illustrated in FIG. 1. The number of slave devices is not limited thereto, and may be another number.

The field network 30 is realized by connecting a plurality of slave devices 211, 212, and 213 with communication cables. In this case, the control device 10 is connected to the slave device 211 via a communication cable, the slave device 211 is connected to the slave device 212 via a communication cable, and the slave device 212 is connected to the slave device 213 via a communication cable, as illustrated in FIG. 1. In other words, the control device 10 is connected to the slave device 212 via the communication cable, the slave device 211, and the communication cable. Further, the control device 10 is connected to the slave device 213 via the communication cable, the slave device 211, the communication cable, the slave device 212, and the communication cable.

The field network 30 is a network conforming to, for example, EtherCAT (registered trademark) as a network standard. The field network 30 is not limited thereto, and may be a network in which a controller transmits data in one frame to all slave devices logically connected to a ring network, and the slave device performs "on the fly" on the received frame, thereby realizing time synchronization.

The information communication network 60 is, for example, a network conforming to Ethernet (registered trademark) as a network standard. The control device 10, the personal computer 61, and the database device 62 are connected to one another by an information communication network 60.

An editing tool for the control program, or the like is installed in the personal computer 61. The personal computer 61 creates, edits, and outputs a control program for the control device 10, the slave device 211, the slave device 212, and the slave device 213. The personal computer 61 outputs the control program to the control device 10. The slave device 211, the slave device 212, and the slave device 213, which are control targets, a control command for each slave device, and the like are described in this control program.

Further, the personal computer 61 stores an execution program for a running-in operation. The personal computer 61 outputs the execution program for a running-in operation to the control device 10 in response to an operation input from the user. Further, the personal computer 61 displays a diagnosis result for the field network 30 according to the execution program for a running-in operation. An example of a specific display screen will be described below.

The database device 62 stores, for example, logs of the respective devices acquired from the control device 10. The database device 62 may store the diagnosis result for the field network 30 described above, and a past log of coping methods.

The control device 10 is specifically realized by, for example, a programmable logic controller (PLC). The control device 10 may be another device as long as the device communicates control data and data for a diagnosis of the field network 30 via the field network 30.

The control device 10, for example, generates control data to be communicated via the field network 30 using the control program from the personal computer 61.

Further, the control device 10, for example, generates the data for a diagnosis of the field network 30 such as the data for actual measurement of propagation delay on the basis of the execution program for a running-in operation from the personal computer 61.

The slave device 211, the slave device 212, and the slave device 213 are specifically realized by, for example, a servo driver, or a measurement device such as a sensor. These slave devices may be, for example, a robot device or a robot control device connected to the robot device.

The control device 10, the slave device 211, the slave device 212, and the slave device 213 communicate control data according to a communication cycle preset by the control program or the like, and execute operations and processes in synchronization with a predetermined timing based on the control cycle.

The control device 10, the slave device 211, the slave device 212, and the slave device 213 perform transmission and reception of the data for actual measurement of propagation delay. Specifically, as outbound processing, the control device 10 transmits the data for actual measurement of propagation delay to the slave device 211. The slave device 211 receives the data for actual measurement of propagation delay from the control device 10, writes a time stamp to the data for actual measurement of propagation delay, and transmits the resultant data for actual measurement of propagation delay to the slave device 212 on the end side. The slave device 212 receives the data for actual measurement of propagation delay from the slave device 211, writes a time stamp to the data for actual measurement of propagation delay, and transmits the resultant data for actual measurement of propagation delay to the slave device 213 on the end side. Thereafter, as a returning process, when the slave device 213 receives the data for actual measurement of propagation delay from the slave device 212, the slave device 213 writes a time stamp to the data for actual measurement of propagation delay, and returns and transmits the resultant data for actual measurement of propagation delay to the slave device 212. The slave device 212 receives the data for actual measurement of propagation delay from the slave device 213, writes a time stamp to the data for actual measurement of propagation delay, and transmits the resultant data for actual measurement of propagation delay to the slave device 211. The slave device 211 receives the data for actual measurement of propagation delay from the slave device 212, writes a time stamp to the data for actual measurement of propagation delay, and transmits the resultant data for actual measurement of propagation delay to the control device 10.

(Hardware Configuration of Control Device)

FIG. 2 is a block diagram illustrating a hardware configuration of the control device.

As a hardware configuration, the control device 10 includes a CPU 101, a memory 102, a storage medium 103, a transmission and reception part 104, and a host communication part 105, as illustrated in FIG. 2. In the control device 10, the CPU 101, the memory 102, the storage medium 103, the transmission and reception part 104, and the host communication part 105 are connected to one another by a data bus 100.

The CPU 101 reads a system program and a user application program stored in the storage medium 103 into the memory 102 and executes the program, thereby realizing each process of each functional block to be described below. The user application program includes, for example, the control program and the execution program for a running-in operation described above.

The memory 102 is realized by a volatile storage element such as a DRAM or an SRAM. Further, the storage medium 103 is realized by a nonvolatile storage medium such as a magnetic storage medium or a flash memory.

The transmission and reception part 104 is an interface of the field network 30 in the control device 10. The transmission and reception part 104 executes transmission and reception (communication) of control data conforming to a cyclic cycle. Further, the transmission and reception part 104 executes transmission and reception of the data for actual measurement of propagation delay.

The host communication part 105 is an interface of the information communication network 60 in the control device 10 and executes communication with each device (the personal computer 61, the database device 62, or the like) of a host system described above.

(Functional Blocks of Control Device)

FIG. 3 is a functional block diagram of the control device.

The control device 10 includes the control part 110, the computation part 120, the communication management part 130, the communication driver 140, the user application processing part 150, and the host communication driver 160, as illustrated in FIG. 3.

The control part 110 performs, for example, scheduling of an overall operation (process) of the control device 10 to execute operation control of the computation part 120, operation control of the user application processing part 150, and communication management part 130.

The computation part 120 includes the propagation delay time measurement part 121, the monitoring process execution part 122, and the diagnosis process execution part 123.

The propagation delay time measurement part 121 generates the data for actual measurement of propagation delay according to the execution program for a running-in operation, and outputs the data for actual measurement of propagation delay to the communication management part 130. Further, the propagation delay time measurement part 121 acquires the received data of the data for actual measurement of propagation delay via the communication management part 130. The propagation delay time measurement part 121 calculates a propagation delay time of each slave device and a propagation delay time due to a plurality of slave device groups from the time stamp written to the received data.

The monitoring process execution part 122 calculates a bandwidth load status of the field network 30 from the propagation delay time according to the execution program for a running-in operation. Specifically, the monitoring process execution part 122 calculates the bandwidth load status from a ratio of the propagation delay time of all frames transmitted within one cycle to the preset communication cycle.

The diagnosis process execution part 123 starts up a cable diagnosis mode to execute the cable diagnosis when the received data cannot be acquired within a predetermined time based on the communication cycle despite the fact that the data for actual measurement of propagation delay has been transmitted. A known method can be used for cable diagnosis.

The computation part 120 generates a diagnosis result using processing results of the propagation delay time measurement part 121, the monitoring process execution part 122, and the diagnosis process execution part 123. The computation part 120 outputs the diagnosis result to the control part 110, and the control part 110 outputs the diagnosis result to the personal computer 61 connected to the information communication network 60 via the host communication driver 160.

The communication management part 130 executes scheduling of communication of the control data. Further, the communication management part 130 executes management of transmission and reception of the data for actual measurement of propagation delay.

The communication driver 140 executes control of the transmission and reception part 104 to communicate the control data via the field network 30 according to the cyclic cycle. Further, the communication driver 140 communicates the data for actual measurement of propagation delay via the field network 30.

The user application processing part 150 executes the user application program including the control program and the execution program of a running-in operation described above.

In such a configuration, the control device 10 executes the running-in operation to generate a diagnosis result for the field network 30 before a main operation. The control device 10 outputs the diagnosis result to the personal computer 61, and the personal computer 61 displays the diagnosis result.

Figure 4:
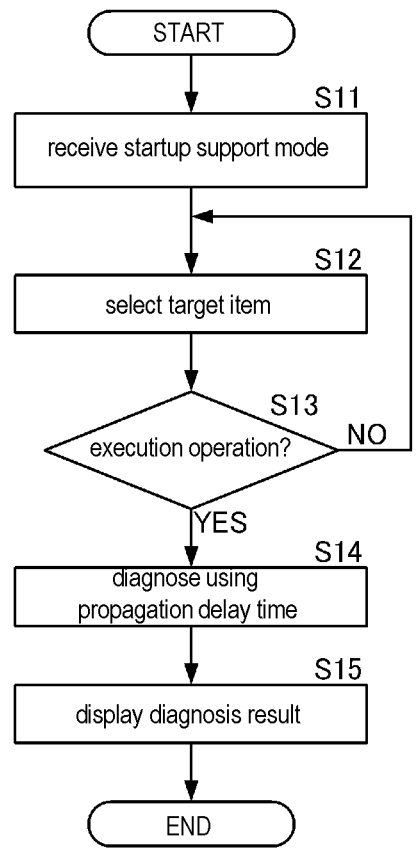
FIG. 4 is a flowchart of a control method.
(A) and (B) of FIG. 5 are diagrams illustrating examples of a display screen in a diagnostic mode.
(A) and (B) of FIG. 6 are diagrams illustrating examples of a display screen for a diagnosis result.

FIG. 4 is a flowchart of the control method.

As illustrated in FIG. 4, the personal computer 61 receives an operation input in a startup support mode (S11). The personal computer 61 executes selection of a diagnosis target item (S12). When the personal computer 61 receives the execution operation (S13: YES), the personal computer 61 instructs the control device 10 to execute the diagnosis of the field network 30.

The control device 10 measures the propagation delay time and executes diagnosis using the propagation delay time (S14). The control device 10 outputs a diagnosis result to the personal computer 61, and the personal computer 61 displays the diagnosis result (S15).

Next, an example of the display screen of the operation input in a diagnostic mode will be described. FIGS. 5(A) and 5(B) are diagrams illustrating an example of a display screen in the diagnostic mode.

Figure 5:
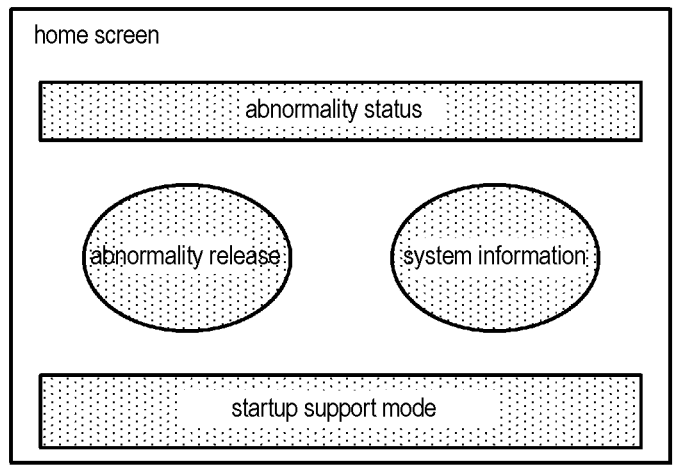
Figure 5:
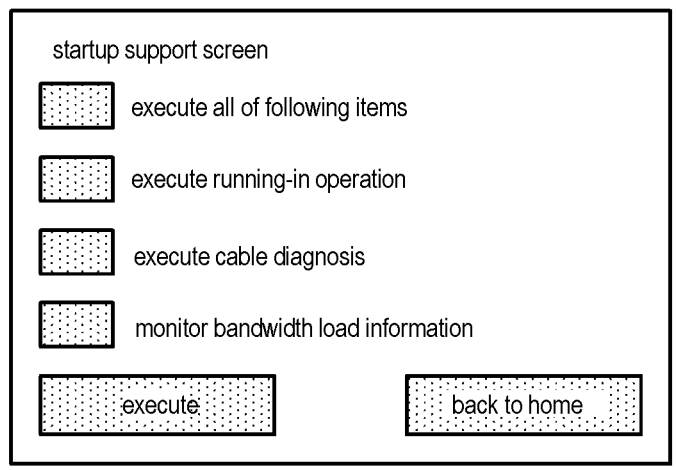

A Home screen for startup support as illustrated in (A) of FIG. 5 is displayed on a screen of the personal computer 61. An icon for receiving an operation input for a display of an abnormality status, an icon for receiving an operation input for abnormality release, an icon for receiving selection of a display of system information, and an icon for receiving execution of the startup support mode are displayed on the Home screen, as illustrated in (A) of FIG. 5.

When the user operates the icon for receiving execution of the startup support mode, the startup support mode in which an operation status of the field network 30 is detected is executed. When the execution of the startup support mode is received, a screen illustrated in (B) of FIG. 5 is displayed.

A plurality of items to be executed, a box for selecting whether or not the plurality of items is executed, an icon for receiving an operation input for execution, and an icon for receiving an operation input for returning to the Home screen are displayed on the startup support screen, as illustrated in (B) of FIG. 5.

The plurality of items includes items such as "execute all items", "execute a running-in operation", "execute cable diagnosis", and "monitor bandwidth load information". When the user selects a box corresponding to each of these items, the selected item is executed.

For example, when "execute a running-in operation" is selected, the control device 10 executes the running-in operation using the field network 30. In this case, transmission and reception of the data for actual measurement of propagation delay are performed.

When [Execute cable diagnosis] is selected, the control device 10 executes the cable diagnosis for the field network 30. Specifically, when the data for actual measurement of propagation delay is not returned within the predetermined time based on the communication cycle, the control device 10 determines that cable diagnosis is necessary, and executes the cable diagnosis mode. When the data for actual measurement of propagation delay is returned within the predetermined time based on the communication cycle, the control device 10 outputs a diagnosis result indicating that there is no problem in the cables.

When [Monitor bandwidth load information] is selected, the control device 10 transmits or receives the data for actual measurement of propagation delay and acquires the time stamp. The control device 10 calculates the propagation delay time from the time stamp, and calculates the bandwidth load from a ratio of the propagation delay time to the preset communication cycle.

These items are executed by an execution icon being selected, after selection.

Next, an example of a display screen of a diagnosis result will be described. FIGS. 6(A) and 6(B) are diagrams illustrating an example of a display screen of a diagnosis result.

Figure 6:
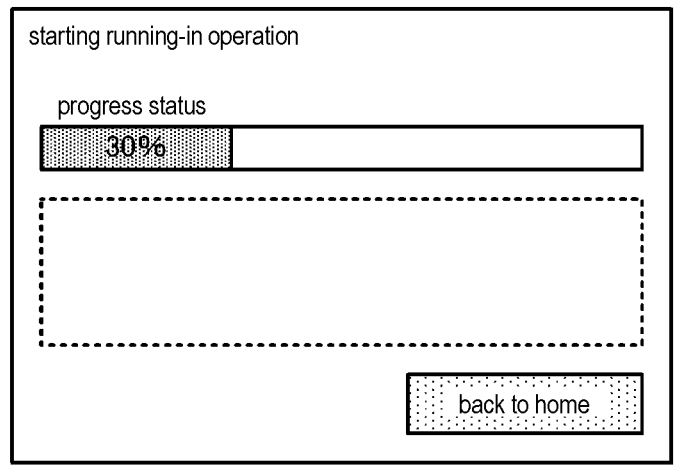
Figure 6:
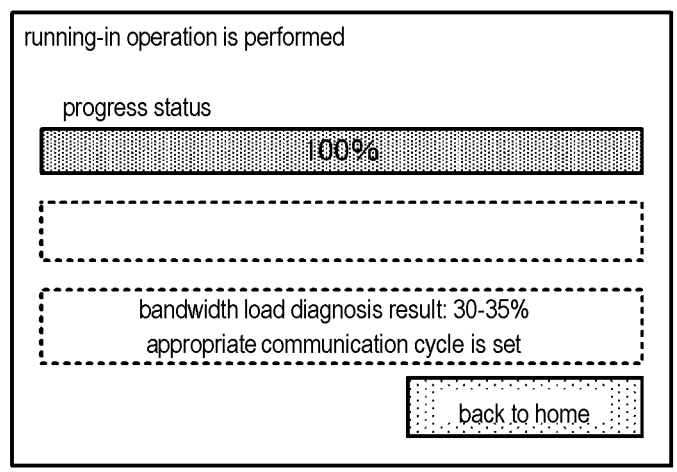

In the running-in operation, a progress status of the running-in operation, that is, a progress status of the diagnosis based on the selected item is displayed, as illustrated in (A) of FIG. 6. Further, in the running-in operation, a currently executed process and a currently known diagnosis result are displayed in an area under the progress status.

When the running-in operation is completed, a progress status of the running-in operation (100% completed) is displayed, as illustrated in (B) of FIG. 6. Further, a diagnosis result is displayed in an area under the progress status after ending of the running-in operation.

Such a display enables the user to recognize how the field network 30 operates, before a main operation starts, by setting the control program. Thereby, normal startup of the control system can be realized more reliably.

REFERENCE SIGNS LIST

1 Control system
10 Control device
12 Compuataion part
30 Field network
60 Information communication network
61 Personal computer
62 Database device
100 Data bus
101 CPU
102 Memory
103 Storage medium
104 Transmission and reception part
105 Host communication part
110 Control part
120 Compuataion part
121 Propagation delay time measurement part
122 Monitoring process execution part
123 Diagnosis process execution part
130 Communication management part
140 Communication driver
150 User application processing part
160 Host communication driver
211, 212, 213 Slave device

What is claimed is:

1. A control device comprising:
a processor configured to manage data communication using cyclic communication conforming to a predetermined communication cycle for a field network,
to execute a running-in operation program to measure a propagation delay time from received data of data for actual measurement of propagation delay transmitted to the field network, and to detect an operation state of the field network using a measurement result of the propagation delay time; and an interface of an information communication network configured to output a detection result of the processor,
wherein the processor performs measurement of the propagation delay time from the received data of the data for actual measurement of propagation delay, and performs monitoring of a bandwidth load of the field network from the propagation delay time, wherein the bandwidth load is a ratio of the propagation delay time of all frames transmitted within one cycle to the predetermined communication cycle.

2. The control device according to claim 1, wherein the processor performs a diagnosis of cables for use in the field network on the basis of a reception state of the data for actual measurement of propagation delay.

3. The control device according to claim 1, wherein the processor executes a process of detecting the operation state of the field network when an operation input of a running-in operation is received.

4. A control method comprising:
  a communication management process of managing data communication using cyclic communication conforming to a predetermined communication cycle for a field network;
  a computation process of executing a running-in operation program to measure a propagation delay time from received data of data for actual measurement of propagation delay transmitted to the field network, and to detect an operation state of the field network using a measurement result of the propagation delay time;
  a result output process of outputting a detection result obtained in the computation process;
  a propagation delay time measurement process of performing measurement of the propagation delay time from the received data of the data for actual measurement of propagation delay; and
  a monitoring process of monitoring of a bandwidth load of the field network from the propagation delay time, wherein the bandwidth load is a ratio of the propagation delay time of all frames transmitted within one cycle to the predetermined communication cycle.

5. A non-transitory storage medium storing a control program causing a computation processing device to execute:
  a communication management process of managing data communication using cyclic communication conforming to a predetermined communication cycle for a field network;
  a computation process of executing a running-in operation program to measure a propagation delay time from received data of data for actual measurement of propagation delay transmitted to the field network, and to detect an operation state of the field network using a measurement result of the propagation delay time;
  a result output process of outputting a detection result obtained in the computation process;
  a propagation delay time measurement process of performing measurement of the propagation delay time from the received data of the data for actual measurement of propagation delay;
  a monitoring process of monitoring of a bandwidth load of the field network from the propagation delay time, wherein the bandwidth load is a ratio of the propagation delay time of all frames transmitted within one cycle to the predetermined communication cycle.

6. The control device according to claim 1, wherein the processor performs a diagnosis of cables for use in the field network on the basis of a reception state of the data for actual measurement of propagation delay.

7. The control device according to claim 1, wherein the processor executes a process of detecting the operation state of the field network when an operation input of a running-in operation is received.

8. The control device according to claim 2, wherein the processor executes a process of detecting the operation state of the field network when an operation input of a running-in operation is received.

9. The control device according to claim 6, wherein the processor executes a process of detecting the operation state of the field network when an operation input of a running-in operation is received.

* * * * *